United States Patent [19]

Ozawa et al.

[11] Patent Number: 4,921,829

[45] Date of Patent: May 1, 1990

[54] CATALYST FOR PURIFING EXHAUST GASES

[75] Inventors: Masakuni Ozawa; Mareo Kimura; Akio Isogai, all of Aichi, Japan

[73] Assignee: Kabushiki Kaisha Toyota Chuo Kenkyusho, Aichi, Japan

[21] Appl. No.: 287,019

[22] Filed: Dec. 21, 1988

[30] Foreign Application Priority Data

Dec. 22, 1987 [JP] Japan ................ 62-325048

[51] Int. Cl.$^5$ .............. B01J 21/06; B01J 23/10; B01J 23/58
[52] U.S. Cl. ................... 502/302; 502/303; 502/304; 502/525; 423/213.5
[58] Field of Search ............ 502/525, 302, 303, 304; 423/213.5

[56] References Cited

U.S. PATENT DOCUMENTS

| | | | |
|---|---|---|---|
| 3,905,918 | 9/1975 | Mai et al. | 502/525 X |
| 4,089,810 | 5/1978 | Diwell et al. | 502/525 X |
| 4,151,123 | 4/1979 | McCann | 502/525 X |

FOREIGN PATENT DOCUMENTS 58-156349 9/1983 Japan .

*Primary Examiner*—W. J. Shine
*Attorney, Agent, or Firm*—Oblon, Spivak, McClelland, Maier & Neustadt

[57] ABSTRACT

A catalyst for purifying exhaust gases comprises: a perovskite-type complex oxide represented by the general formula $Ln_{1-x}A_xMO_3$, wherein Ln represents at least one rare earth metal, A presents at least one alkaline earth metal and M represents at least one transition metal, and $0 < x < 1$; at least one heat resistant complex oxide; and at least one precious metal. The heat resistant complex oxide is one of $ABO_3$, $LnAlO_3$ or $Ln_2B_2O_7$, wherein A represents at least one alkaline earth metal, B represents at least one of Ti, Zr and Hf, and Ln represents at least one rare earth metal, and the precious metal is at least one of Pt, Pd, Rh, Ir, Ru and Os. The catalyst is usable as a temperature of 900° C. or above without sintering or reduction of a catalytic activity.

9 Claims, No Drawings

CATALYST FOR PURIFING EXHAUST GASES

BACKGROUND OF THE INVENTION

1. Field of the Invention

The present invention relates to a 3-way catalyst for purifying exhaust gases which is used at a temperature of not lower than 900° C. and which is excellent in the carbon monoxide (CO), hydrocarbons (HC) and nitrogen oxides (NOx) converting capacity.

2. Description of the Prior Art

Perovskite-type complex oxides composed of a rare earth metal, an alkaline earth metal and a transition metal have been expected to be put to practical use as an inexpensive 3-way catalyst for purifying exhaust gases by converting CO, HC and NOx, and some of them are disclosed in Japanese Patent Laid-Open Nos. 87046/1984 and 82138/1985. These catalysts, however, are intended to be used at a temperature below 800° C., and are therefore unsatisfactory as, e.g., a catalyst for an automobile exhaust gas which is required to have a high catalytic activity in a temperature range as high as not lower than 900° C. and durability at a high temperature. This is because a perovskite-type complex oxide causes sintering when it is used at a temperature of 900° C. or above, thereby reducing the effective surface area of the complex oxide and greatly lowering the catalytic activity. In addition, when such a complex oxide is loaded onto a carrier such as alumina and titania which are conventionally used, a solid phase reaction is brought about between the catalyst and the carrier at a temperature of 900° C. or above, which cannot maintain the perovskite structure, resulting in great reduction in the catalytic activity. Although the perovskite-type complex oxide is excellent in the CO and HC converting capacity, it is slightly inferior in the NOx converting capacity. Thus, the conventional perovskite-type complex oxide is inadequate for practical use as a 3-way catalyst for purifying automobile exhaust gases.

SUMMARY OF THE INVENTION

Accordingly, it is an object of the present invention to provide a 3-way catalyst for purifying exhaust gases which has durability at a temperature of 900° C. or above.

To achieve this aim, the present inventors have studied a carrier capable of preventing sintering and reduction in the catalytic activity due to a reaction with the carrier, which are the problems produced when the conventional perovskite-type complex oxide is used as a catalyst ingredient at a high temperature such as not lower than 900° C. for a long time, and capable of maintaining the catalyst ingredients in a highly dispersed state. The present inventors have also studied a catalyst ingredient which is capable of improving the NOx converting capacity.

As a result, the present invention provides a catalyst for purifying exhaust gases comprising: a perovskite-type complex oxide represented by the general formula $Ln_{1-x}A_xMO_3$, wherein Ln represents at least one rare earth metal, A represents at least one alkaline earth metal and M represents at least one transition element, and $0<x<1$; at least one complex oxide having heat resistance; and at least one precious metal.

The first characteristic feature of the present invention is that at least one heat-resistant complex oxide is coexistent with a catalyst ingredient consisting of a perovskite-type complex oxide. The heat-resistant complex oxide is thermally stable even at a high temperature such as 900° C., and does not react with the perovskite-type complex oxide unlike $Al_2O_3$, which is conventionally used. As a result, the perovskite structure is not broken, thereby preventing the catalytic activity from being lowered. The heat-resistant complex oxide and the perovskite-type complex oxide commonly have rare earth metals or alkaline earth metals which have a similar chemical nature. At the contact portion between the heat-resistant complex oxide and the perovskite-type complex oxide, these metals sightly dissolve into each other in a solid state, so that the perovskite-type complex oxide firmly adheres to the heat-resistant complex oxide. Consequently, the perovskite-type complex oxide is prevented from migration, and the lowering of the catalytic activity due to the decrease in surface area is effectively prevented. These effects are successively achieved both in the case of using the perovskite-type complex oxide loaded onto the heat-resistant complex oxide and in the case of using the mixture of the powder of the catalyst ingredient and the powder of the heat-resistant complex oxide. Even after the catalyst is used at a high temperature such as 900° C. or above for a long time, it is possible to maintain the perovskite-type complex oxide in a highly dispersed state on the carrier or in the powder of the heat-resistant complex oxide.

The second characteristic feature of the present invention is that at least one precious metal such as Pd is added as a catalyst ingredient to the perovskite-type complex oxide. Perovskite-type complex oxide itself can be used as a 3-way catalyst, but the NOx converting capacity is slightly inferior to the HC and CO converting capacity. In order to enhance the activity to NOx, a small amount of precious metal is added. Since the perovskite-type complex oxide itself has an NOx converting capacity, addition of less amount (several %) of a precious metal than that of the conventional 3-way catalyst produces the NOx converting capacity similar or superior to that of the conventional 3-way catalyst. The precious metal is loaded onto the perovskite-type complex oxide. Since the perovskite-type complex oxide is loaded onto the heat-resistant complex oxide in a highly dispersed state even at a high temperature such as 900° C., the precious metal is unlikely to cause sintering, thereby maintaining the high purifying activity. Thus, the catalyst according to the present invention is an inexpensive 3-way catalyst for purifying automobile exhaust gases which has durability at a temperature as high as 900° C. or above.

DETAILED DESCRIPTION OF THE INVENTION

A perovskite-type complex oxide, which is one of the catalyst ingredients of the present invention, is a compound represented by the general formula $Ln_{1-x}A_xMO_3$, wherein Ln represents at least one rare earth metal, A represents at least one alkaline earth metal and M represents at least one transicomplex oxide used is preferably 1 to 80 wt%, and more preferably 30 to 60 wt% of the total amount of catalyst. If it is less than 1 wt%, the catalytic activity tends to be low. On the other hand, if it is more than 80 wt%, the effect of the heat-resistant complex oxide is not sufficient. The shape, particle size, purity, specific surface area, etc. may be freely selected so long as they are in the range of those of an ordinary catalyst ingredient.

The heat-resistant complex oxide is at least one selected from the group consisting of compounds represented by the general formula $ABO_3$, $LnAlO_3$ or $Ln_2B_2O_7$, wherein A represents at least one alkaline earth metal, B represents at least one of Ti, Zr and Hf, and Ln represents at least one rare earth metal. These compounds are used in the same state (shape, particle size, purity, specific surface area, etc.) as a widely used catalyst carrier such as $Al_2O_3$. For example, the specific surface area is preferably not less than 10 $m^2$/g in order to maintain the catalyst ingredients in a highly dispersed state. Generally, a commercially available material is usable.

A precious metal, which is the other catalyst ingredient, is at least one selected from the group consisting of Pt, Pd, Rh, Ir, Ru and Os. Among these precious metals, Pd enhances the purifying capacity most. The amount of precious metal is preferably 0.01 to 2 wt% based on the total amount of catalyst. If it is less than 0.01 wt%, the improvement of the NOx converting capacity is insufficient, while addition of more than 2 wt% of precious metal is useless due to the saturated converting capacity. These precious metals are used in the same state (shape, particle size, purity, specific surface area, etc.) as a conventional 3-way catalyst.

The catalyst according to the present invention is produced by an ordinary catalyst producing method. An example thereof will now be explained.

When a catalyst ingredient is loaded onto a carrier, an aqueous solution of the nitrates of metals constituting a perovskite-type complex oxide, which is a catalyst ingredient, and mixed with each other in a stoichiometric ratio, is added to a carrier powder consisting of a commercially available heat-resistant complex oxide. The resulting mixture is dried in air at 100° to 150° C. for 5 to 12 hours, and therefore heated in air at 600° to 900° C. for 5 to 10 hours. This heat treatment causes thermal decomposition of the nitrates, whereby the carrier powder is loaded with the perovskite-type complex oxide. A precious metal such as Pt, Pd and Rh is next loaded onto the perovskite-type complex oxide which has been loaded onto the heat-resistant complex oxide carrier powder. For example, the powder is impregnated with an aqueous solution of palladium nitrate, dried in air at about 100° C. for 5 to 12 hours, and then heated in air at about 600° C. for 3 hours to cause decomposition of the nitrate, thereby loading Pd onto the perovskite-type complex oxide. The resulting mixture is thereafter subjected to heat-treatment in a weak reducing gas at 400° to 900° C. for 1 to 10 hours, and thus activated. In this case, the preferable amount of the precious metal in the catalyst obtained is 0.01 to 0.15 wt% of the total amount of the catalyst. Otherwise, prior to the heat-treatment, the Pd loaded perovskite-type complex oxide is heated in air at 700° to 900° C. In this case, the preferable amount of the precious metal in the catalyst obtained is 0.05 to 1 wt% of the total amount of the catalyst.

Alternatively, after mixing the fine powder of a perovskite-type complex oxide and the fine powder of a heat-resistant complex oxide, a precious metal may be loaded onto the resultant mixture. The fine powder of a perovskite-type complex oxide is prepared in the following way. A predetermined amount of neutralizer such as sodium carbonate and ammonium carbonate is added to and coprecipitated with an aqueous solution of the mixture of the nitrates, oxalates, etc. of metals constituting the perovskite-type complex oxide. The resultant mixture is washed with water, filtered and dried. Thereafter, the dried filtrate is calcined in air at 500° to 600° C. for 3 to 5 hours, pulverized, and further calcined at 700° to 800° C. for 3 to 5 hours, and pulverized into fine powder. It is necessary that the specific surface area of the fine powder is at least several $m^2$/g. A commercially available heat-resistant complex oxide powder is mixed with the thus-obtained fine powder, and a precious metal is loaded onto the powder mixture in the above-described way, thereby obtaining the target catalyst. When the catalyst of the present invention is used, it may be molded into a predetermined shape after a binder is added thereto. Alternatively, water may be added to the catalyst and the thus-obtained slurry catalyst may be applied to a base material.

It is also possible to produce the catalyst by covering a base material with a heat-resistant complex oxide, and loading the heat-resistant complex oxide with a perovskite-type complex oxide and a precious metal, which are catalyst ingredients. The catalyst may be applied to a substrate or may be used in form of pellets, a honeycomb or a porous body.

Preferred embodiments of the present invention will be explained with reference to the following non-limitative examples.

In Examples 1 to 7, a heat-resistant complex oxide is loaded with a perovskite-type complex oxide and one or more precious metals, and in Examples 8 and 9, a mixed powder of a heat-resistant complex oxide and a perovskite-type complex oxide is loaded with a precious metal. The compositions of the catalysts obtained in the following Examples and Comparactive Examples are shown in Table 1.

EXAMPLE 1

As a carrier, 70 g of a commercially available $SrZrO_3$ powder having a specific surface area of 18 $m^2$/g and a purity of not less than 99% was prepared. 100 ml of an aqueous solution with 44.1 g of lanthanum nitrate ($La(NO_3)_3 \cdot 6H_2O$), 5.39 g of strontium nitrate ($Sr(NO_3)_2$) and 37.05 g of cobalt nitrate ($Co(NO_3)_2$) dissolved therein was added to and mixed with the carrier. The resultant mixture was dried in air at 110° C. for 10 hours. Thereafter, the mixture was calcined in air at 800° C. for 3 hours to thermally decompose the nitrates and obtain the $SrZrO_3$ powder loaded with a perovskite-type complex oxide $La_{0.8}Sr_{0.2}CoO_3$.

The powder was impregnated with an aqueous solution of palladium nitrate, dried in air at 110° C. for 10 hours and then heated in air at 600° C. for 3 hours and, thereafter, at 800° C. for 3 hours. The resulting mixture was further heated in weak reducing gas at 600° C. for 2 hours. Thus, a catalyst (Sample No. 1) containing 0.5 wt% of loaded Pd was produced. In the composition of the catalyst, $SrZrO_3:La_{0.8}Sr_{0.2}CoO_3:Pd = 70:30:0.5$ by weight ratio.

EXAMPLE 2

A catalyst (Sample No. 2) containing 0.5 wt% of loaded Pd was produced in the same way as in Example 1 except that 40 g of $SrTiO_3$ was used in place of $SrZrO_3$, and 200 ml of an aqueous solution with 60.1 g of lanthanum nitrate, 29.4 g of strontium nitrate and 79.7 g of manganese nitrate ($Mn(NO_3)_2 \cdot 6H_2O$) dissolved therein was added to the carrier in place of the aqueous solution used in Example 1.

EXAMPLE 3

As a carrier, 50 g of a commercially available $SrZrO_3$ powder having a purity of not less than 99% was prepared. 160 ml of an aqueous solution with 74.1 g of lanthanum nitrate, 9.05 g of strontium nitrate, 24.9 g of cobalt nitrate and 51.85 g of iron nitrate ($Fe(NO_3)_3 \cdot 9H_2O$) dissolved therein was added to and mixed with the carrier. The resultant mixture was dried in air at 110° C. for 10 hours. Thereafter, the mixture was calcined in air at 800° C. for 3 hours in the same way as in Example 1 to obtain the $SrZrO_3$ powder loaded with a perovskite-type complex oxide $La_{0.8}Sr_{0.2}Co_{0.4}Fe_{0.6}O_3$. Thereafter, a catalyst (Sample No. 3) containing 0.1 wt% of loaded Pd was produced by using an aqueous solution of palladium nitrate in the same way as in Example 1 except the heat-treatment in air at 800° C. for 3 hours.

EXAMPLE 4

A catalyst (Sample No. 4) in accordance with the present invention was produced in the same way as in Example 3 except that 160 ml of an aqueous solution with 82.0 g of lanthanum nitrate, 44.5 g of strontium nitrate and 85.0 g of iron nitrate dissolved therein was added to the carrier in place of the aqueous solution used in Example 1.

EXAMPLE 5

A catalyst consisting of a perovskite-type complex oxide containing Mn and Co, a heat-resistant complex oxide $LaAlO_3$, and a precious metal Pd was produced.

$LaAlO_3$ powder was first synthesized. 100 g of $\gamma$-$Al_2O_3$ having a purity of 99% was added to and mixed with 400 ml of an aqueous solution with 425 g of lanthanum nitrate ($La(NO_3)_3 \cdot 6H_2O$) dissolved therein. The resultant mixture was evaporated and dried. Thereafter, the mixture was calcined in air at 600° C. for 3 hours and further at 900° C. for 8 hours to obtain the $LaAlO_3$ powder.

150 ml of an aqueous solution with 58.17 g of lanthanum nitrate, 18.95 g of strontium nitrate, 32.13 g of manganese nitrate and 32.58 g of cobalt nitrate dissolved therein was added to and mixed with 50 g of the $LaAlO_3$ powder. The resultant mixture was dried in air at 110° C. for 10 hours. Thereafter, the mixture was calcined in air at 800° C. for 3 hours to thermally decompose the nitrates and obtain the $LaAlO_3$ powder loaded with a perovskite-type complex oxide $La_{0.6}Sr_{0.4}Mn_{0.5}Co_{0.5}O_3$.

Thereafter, a catalyst (Sample No. 5) containing 1 wt% of loaded Pd was produced by using an aqueous solution of palladium nitrate in the same way as in Example 1.

EXAMPLE 6

A catalyst using $Nd_2Zr_2O_7$ as a heat-resistant complex oxide was produced.

$Nd_2Zr_2O_7$ powder was first synthesized. 2 l of an aqueous solution with 219.1 g of neodymium nitrate ($Nd(NO_3)_3 \cdot 6H_2O$) and 133.6 g of zirconium nitrate ($ZrONO_3 \cdot 2H_2O$)) dissolved therein was neutralized by adding 1.8 l of 10% ammonia water. The precipitate obtained was washed with water, filtered, dried, and calcined in air at 600° C. for 3 hours and, further, 800° C. for 3 hours.

110 ml of an aqueous solution with 58.49 g of neodymium nitrate, 7.06 g of strontium nitrate and 48.54 g of cobalt nitrate dissolved therein was added to and mixed with 60 g of the $Nd_2Zr_2O_7$ powder. The resultant mixture was dried in air at 110° C. for 10 hours. Thereafter, the mixture was calcined in air at 800° C. for 3 hours to obtain the $Nd_2Zr_2O_7$ powder loaded with a perovskite-type complex oxide $Nd_{0.8}Sr_{0.2}CoO_3$.

Thereafter, the powder was impregnated with an aqueous solution of chloroplatinic acid, dried in air at 110° C. for 10 hours and then heated in air at 600° C. for 3 hours and, thereafter, at 800° C. for 3 hours. The resulting mixture was further heated in weak reducing gas at 600° C. for 2 hours. Thus, a catalyst (Sample No. 6) containing 0.5 wt% of loaded Pt was produced.

EXAMPLE 7

As a carrier, 70 g of $SrTiO_3$ powder was prepared. 100 ml of an aqueous solution with 44.34 g of lanthanum nitrate, 54.2 g of strontium nitrate, 22.35 g of cobalt nitrate and 20.68 g of iron nitrate dissolved therein was added to and mixed with the carrier. The resultant mixture was dried and calcined in the same way as in Example 1 to obtain the $SrTiO_3$ powder loaded with a perovskite-type complex oxide $La_{0.8}Sr_{0.2}Co_{0.6}Fe_{0.4}O_3$. Thereafter, a catalyst (Sample No. 7) consisting of the powder loaded with 0.4 wt% of Pd and 0.1 wt% of Rh was produced by using an aqueous solution of palladium nitrate and rhodium nitrate in the same way as in Example 1.

EXAMPLE 8

Perovskite-type complex oxide $La_{0.8}Sr_{0.2}CoO_3$ powder was prepared in the following way. 346.5 g of lanthanum nitrate and 42.3 g of strontium nitrate and 291.0 g of cobalt nitrate were dissolved in distilled water to produce 5 l of an aqueous solution. 3 l of an aqueous solution with 350 g of sodium carbonate $Na_2CO_3$ dissolved therein was next prepared as a coprecipitation reagent. The coprecipitation reagent was added dropwise to the aqueous solution to obtain a precipitate. The precipitate obtained was thoroughly washed with water, filtered and dried in vacuum. The precipitate was then calcined in air at 600° C. for 3 hours, pulverized, calcined at 800° C. for 3 hours and further pulverized. Thus, $La_{0.8}Sr_{0.2}CoO_3$ powder was obtained.

100 g of a commercially available $SrZrO_3$ powder having a purity of 99% and a specific surface area of 18 $m^2/g$ and 100 g of the $La_{0.8}Sr_{0.2}CoO_3$ powder were thoroughly mixed. The powder mixture was impregnated in the same way as in Example 1. Thus, a catalyst (Sample No. 8) containing 0.5 wt% of loaded Pd was produced.

EXAMPLE 9

Perovskite-type complex oxide $La_{0.8}Sr_{0.2}Co_{0.6}Fe_{0.4}O_3$ powder was prepared in the same way as in Example 8 except that 291.0 g of the cobalt nitrate in Example 8 was replaced by 174.6 g of cobalt nitrate and 161.6 g of iron nitrate. 80 g of $SrZrO_3$ powder was thoroughly mixed with 120 g of the $La_{0.8}Sr_{0.2}Co_{0.6}Fe_{0.4}O_3$ powder.

Thereafter, a catalyst (Sample No. 9) consisting of the mixed powder loaded with 0.1 wt% of Pd was produced in the same way as in Example 3.

COMPARATIVE EXAMPLE 1

A catalyst (Sample No. 10) for comparison was produced by using the perovskite-type complex oxide $La_{0.8}Sr_{0.2}CoO_3$ powder which was produced in Example 8 and loading the powder with 0.5 wt% of Pd by using an aqueous solution of palladium nitrate.

COMPARATIVE EXAMPLE 2

A catalyst (Sample No. 11) for comparison containing 0.1 wt% of loaded Pd was produced in the same way as in Comparative Example 1 except for using the perovskite-type complex oxide $La_{0.9}Sr_{0.2}Co_{0.6}Fe_{0.4}O_3$ powder which was produced in Example 9.

COMPARATIVE EXAMPLE 3

A catalyst (Sample No. 12) for comparison was produced in the same way as in Example 1 except for using $\alpha$-$Al_2O_3$ powder having a specific surface area of 18 $m^2/g$ in place of $SrZrO_3$.

COMPARATIVE EXAMPLE 4

A catalyst (Sample No. 13) for comparison was produced in the same way as in Example 9 except for using rutile $TiO_2$ powder in place of $SrZrO_3$.

TEST 1

In order to examine the heat resistance of the catalysts, those produced in Examples and Comparative Examples were heated to 1030° C. for 50 hours in air.

TEST 2

Some of the catalysts produced in Examples and Comparative Examples were subjected to 5-hour durability test of the purifying activity in an exhaust gas having an inlet gas temperature of 930° C. The composition of the gas was 1.0% of CO, 0.1% of $C_3H_6$, 1.0% of $CO_2$, 1.0% of $H_2O$ and the balance $N_2$ under the varying condition of $O_2$.

EVALUATION

The conversions of carbon monoxide (CO), propylene ($C_3H_6$) and nitrogen oxide (NO) of the catalysts which had been subjected to the heat resistance test and the durability test were measured. The catalyst powder was pressure molded into a pellet of about 2 mm$\phi$ and charged into a reaction tube before measurement. The space velocity at the time of measurement was 30,000 $hr^{-1}$. The composition of the gas was 1.0% of CO, 0.05% of $C_3H_6$, 10% of $CO_2$, 10% of $H_2O$, 0.2% of $N_2$, 0.05% of NO and the balance $N_2$ under the varying condition of $O_2$.

The results of Test 1 together with the compositions of the catalysts are shown in Table 1. The catalysts of the present invention are superior in the heat resistance to those of Comparative Examples. Thus, the effect of the coexistence of a heat-resistant complex oxide is manifested.

The results of Test 2 are shown in Table 2. The catalysts of the present invention are superior in the durability to those of Comparative Examples,

TABLE 1

| Sample No. | Composition (weight ratio) | Conversion (%) CO | $C_3H_6$ | NO |
|---|---|---|---|---|
| Example | | | | |
| 1 | $La_{0.8}Sr_{0.2}CoO_3$ (30) + $SrZrO_3$ (70) + Pd (0.5) | 82 | 80 | 83 |
| 2 | $La_{0.5}Sr_{0.5}MnO_3$ (60) + $SrTiO_3$ (40) + Pd (0.5) | 79 | 76 | 76 |
| 3 | $La_{0.8}Sr_{0.2}Co_{0.4}Fe_{0.6}O_3$ (50) + $SrZrO_3$ (50) + Pd (0.1) | 89 | 82 | 76 |
| 4 | $La_{0.9}Sr_{0.1}FeO_3$ (50) + $SrZrO_3$ (50) + Pd (0.5) | 80 | 76 | 78 |

TABLE 1-continued

| Sample No. | Composition (weight ratio) | Conversion (%) CO | $C_3H_6$ | NO |
|---|---|---|---|---|
| 5 | $La_{0.6}Sr_{0.4}Mn_{0.5}Co_{0.5}O_3$ (50) + $LaAlO_3$ (50) + Pd (1) | 88 | 85 | 83 |
| 6 | $Nd_{0.8}Sr_{0.2}CoO_3$ (40) + $Nd_2Zr_2O_7$ (60) + Pt (0.5) | 83 | 79 | 80 |
| 7 | $La_{0.8}Sr_{0.2}Co_{0.6}Fe_{0.4}O_3$ (30) + $SrTiO_3$ (70) + Pd (0.4) + Rh (0.1) | 80 | 76 | 78 |
| 8 | $La_{0.8}Sr_{0.2}CoO_3$ (50) + $SrZrO_3$ (50) + Pd (0.5) | 78 | 76 | 76 |
| 9 | $La_{0.8}Sr_{0.2}Co_{0.6}Fe_{0.4}O_3$ (60) + $SrZrO_3$ (40) + Pd (0.1) | 80 | 78 | 72 |
| Comparative Example | | | | |
| 10 | $La_{0.8}Sr_{0.2}CoO_3$ (100) + Pd (0.5) | 75 | 70 | 70 |
| 11 | $La_{0.8}Sr_{0.2}Co_{0.6}Fe_{0.4}O_3$ (100) + Pd (0.1) | 72 | 60 | 61 |
| 12 | $La_{0.8}Sr_{0.2}CoO_3$ (30) + $Al_2O_3$ (70) + Pd (0.5) | 60 | 53 | 58 |
| 13 | $La_{0.8}Sr_{0.2}Co_{0.6}Fe_{0.4}O_3$ (50) + $TiO_2$ (50) + Pd (0.1) | 59 | 42 | 40 |

TABLE 2

| Sample No. | Composition (weight ratio) | Conversion (%) CO | $C_3H_6$ | NO |
|---|---|---|---|---|
| Example | | | | |
| 3 | $La_{0.8}Sr_{0.2}Co_{0.4}Fe_{0.6}O_3$ (50) + $SrZrO_3$ (50) + Pd (0.1) | 88 | 80 | 79 |
| 9 | $La_{0.8}Sr_{0.2}Co_{0.6}Fe_{0.4}O_3$ (50) + $SrTiO_3$ (50) + Pd (0.1) | 84 | 79 | 76 |
| 11 | $La_{0.8}Sr_{0.2}Co_{0.6}Fe_{0.4}O_3$ (100) + Pd (0.1) | 75 | 69 | 68 |
| 13 | $La_{0.8}Sr_{0.2}Co_{0.6}Fe_{0.4}O_3$ (50) + $TiO_2$ (50) + Pd (0.1) | 68 | 62 | 66 |

It is understood that the foregoing detailed description is given merely by way of illustration and that many variations may be made therein without departing from the spirit of this invention.

What is claimed is:

1. A catalyst for purifying exhaust gases comprising:
   (a) at least one heat resistant complex oxide selected from the group consisting of compounds represented by one of $ABO_3$, $LnAlO_3$ and $Ln_2B_2O_7$, wherein A represents at least one alkaline earth metal, B represents at least one of Ti, Zr and Hf, and Ln represents at least one rare earth metal;
   (b) a perovskite complex oxide in an amount of from 1 to 80 wt.%, said perovskite complex oxide being represented by the general formula $Ln_{1-x}A_xMO_3$, wherein Ln represents at least one rare earth metal, A represents at least one alkaline earth metal and M represents at least one transition metal, and $0 < x < 1$; and
   (c) at least one precious metal in an amount of from 0.01 to 2 wt.%.

2. A catalyst according to claim 1, wherein said heat resistant complex oxide is $Ln_2B_2O_7$, wherein B represents at least one of Ti, Zr and Hf, and Ln represents at least one rare earth metal.

3. A catalyst according to claim 1, wherein said precious metal is at least one selected from the group consisting of Pt, Pd, Rh, Ir, Ru and Os.

4. A catalyst according to claim 1, wherein the content of said perovskite complex oxide is from 30 to 60 wt.% of the total amount of the catalyst.

5. A catalyst according to claim 1, wherein said catalyst is one formed by adding an aqueous solution of salts of said metals constituting said perovskite complex oxide to a powder of said heat resistant complex oxide, followed by drying and heating at a temperature of 600 to 900° C.

6. A catalyst according to claim 5, wherein said catalyst is one formed by adding to the resultant material an aqueous solution of a salt of said precious metal, followed by heating and decomposing the salt, heating in air at 700 to 900° C, and heating in a weak reducing gas at 400 to 900° C, the content of said precious metal being 0.05 to 1 wt% of the total amount of the resultant catalyst.

7. A catalyst according to claim 1, which is applied to a substrate.

8. A catalyst according to claim 1, which is in form of one of pellets, a honeycomb and a porous body.

9. A catalyst according to claim 3, wherein said heat resistant complex oxide is $SrZrO_3$.

* * * * *